Oct. 2, 1956 — R. C. MOTT — 2,765,185
SHAFT SEAL
Filed Oct. 24, 1951
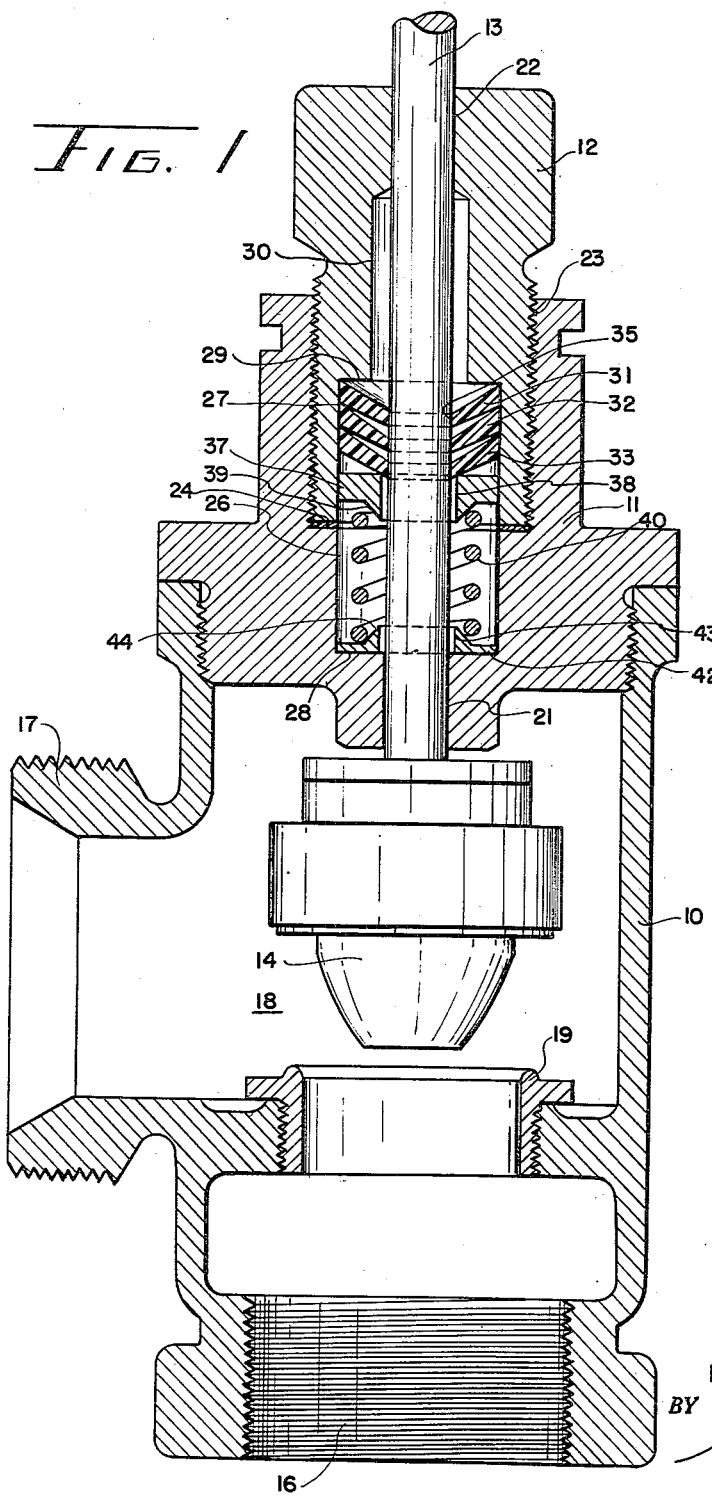
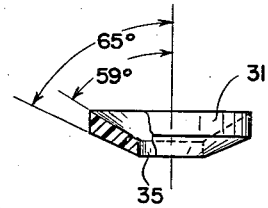
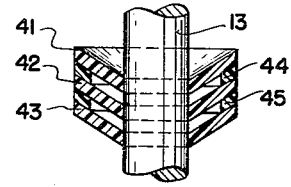
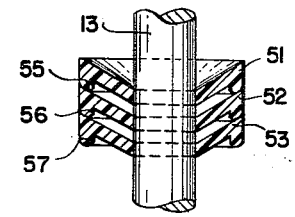
INVENTOR.
RICHARD C. MOTT
BY George H Fisher
ATTORNEY

United States Patent Office 2,765,185
Patented Oct. 2, 1956

2,765,185

SHAFT SEAL

Richard C. Mott, Evanston, Ill., assignor to Minneapolis-Honeywell Regulator Company, Minneapolis, Minn., a corporation of Delaware Application October 24, 1951, Serial No. 252,963

4 Claims. (Cl. 286—30)

This invention relates to improvements in packing for valves and the like.

The packing or sealing of valve stems is an old art but, although many excellent packings are available, no arrangement prior to the present invention is known which is equally satisfactory for hot and cold water and steam. This problem is particularly aggravated for automatic control valves wherein it is desirable to keep friction low and uniform.

The present packing comprises one or more cone-like disks having an inner bore fitting closely about the valve stem and a periphery of which fits snugly against the walls of the packing gland or bonnet. The disk or disks are arranged with the convex side facing the higher pressure and a spring is arranged under the convex side to maintain a predetermined pressure against the cone, this spring force tending to flex the disk in a manner to decrease the diameter of the inner hole and enlarge the periphery. Further, any other pressure exerted against this convex space acts in the same manner. It has been found advisable to use a polished shaft with such packing and, by providing sufficient free space around the shaft above and below the packing so that no portion of the shaft coacting with the packing can rub against any metallic surface, the polished shaft is kept smooth thereby greatly prolonging the life of the seal.

It is thus an object to provide an improved sealing structure for valves and the like of the sort above described which is effective under widely varying conditions and which is ideally suited for automatic control valves because of its low friction and long life. A study of the following specification and drawings will reveal other more specific objects and advantages of the present construction.

In the drawings:

Figure 1 is a sectional elevation view of an automatic control valve, less motor, showing the present packing arrangement.

Figure 2 is an elevation view of a packing disk of the sort shown in section in Figure 1, a portion of this disk also being shown in section.

Figure 3 shows in section a stack of modified sealing disks which may be substituted for those shown in Figure 1.

Figure 4 is similar to Figure 3 but shows another modification for the present packing disks.

The valve shown in Figure 1 has a body portion 10, an upper body or bonnet portion 11, a packing nut 12, a valve stem or shaft 13 and a valve member or plug 14 carried on the lower end of said shaft 13. Body portion 10 also includes ports 16 and 17 connected by a fluid passage or chamber 18, with valve seat 19 arranged in the passage or chamber for coaction with valve plug 14.

The upper body portion or bonnet 11 of the valve includes a guide means or bearing surface 21 for the stem or shaft 13 and a similar guide surface 22 is preferably formed in nut 12, these two guide surfaces coacting to accurately guide the stem or shaft in its movement. However, if desired, only the lower guide surface 21 may be relied on and the bore 22 may be somewhat enlarged to improve the ease of manufacturing by making it unnecessary to maintain the openings 21 and 22 in exact alignment. While packing nut 12 is threaded into body portion 11 at 23 this arrangement is only suggestive and may be modified if desired. To make certain that there will be no leakage past the threads at 23, a sealing washer 24 is interposed between nut 12 and portion 11. Because nut 12 is threaded into the upper body portion 11 and coacts therewith, it is considered, for the purpose of this description, a part of the upper body portion of the valve.

To house the sealing or packing means for the valve stem or shaft 13, a recess 26 is formed in portion 11 just above bearing surface 21 and extends as at 27, into the nut portion 12, this recess being in the form of a cylindrical bore and concentric with member 13. Recess 26 and 27 is terminated at the lower end by a shoulder 28 and at the upper end by an abutment portion 29, with a smaller diameter extension 30 of said space extending above abutment surface 29 to a point at the lower end of guide surface 22. The actual sealing is effected by a plurality of cone shaped disks 31, 32 and 33, the periphery of these disks being large enough in diameter to fit closely in the recess 27 and the central bore of the disks, such as 35 of disk 31, closely fitting member 13. As best shown in Figure 2, these cone shaped disks each has its bore in the apex portion of the disk and, in Figures 1 and 2, the cross-sectional thickness of the disk varies from the periphery into the bore, the disk being thicker in the peripheral portion. While disks 31, 32 and 33 may be made of any suitable material, a substance known commercially as "Teflon," the material being a polytetrafluoroethylene, has been found to be very satisfactory. Another fluorinated hydrocarbon material which may be used is known as fluorothene or "Kel-F," a trifluoromonochloroethylene substance having characteristics generally similar to those of the aforementioned "Teflon." The fluorinated hydrocarbon materials above suggested are most desirable for this purpose because of an inherent slipperiness and great resistance to chemical actions of the more common sorts, a good resistance to heat and cold and the physical characteristic of being moderately deformable. Obviously, other materials having the properties mentioned to the extent necessary for the particular application in mind may be used.

As shown, the base portion of disk 31 bears against the abutment portion 29 of the sealing recess 26—27, disk 32 is adjacent disk 31 and disk 33 is adjacent disk 32. With the peripheries of these disks being in engagement with each other and the wall of the recess 27 the stem engaging bores of the disks are spaced apart due to the lesser thickness of the disks at the bore portion. The disks are held in place by a pressure pad or spring follower 37, this member being proportioned to slide freely in recess 27 and to be guided thereby. A bore 38 concentric with stem or shaft 13 is formed in member 37 and is appreciably larger than 13 so that no part of this member may contact the stem in normal operation. The upper inner edge of member 37, around bore 38, abuts the lower or convex face of disk 33 concentric with stem 13 along a line spaced to some extent from the stem. The lower surface of member 37 is provided with an annular ridge 39 for centering a spring 40, spring 40 urging member 37 against the disks with a predetermined force. Spring 40 is guided at its lower end by a member 42 having a bore 43 and an annular rib or guide means 44 for the spring 40 similar to that found on the lower portion of member 37. In this case also, bore 43 is sufficiently large that it will never contact stem 13 in normal operation and the outer diameter of member 42 is sufficiently large to maintain said member 42 concentric with the stem 13.

With the sealing means assembled as shown in Figure 1, spring 40 constantly urges member 37 against disk 33 with a predetermined force and, due to disk 33, as well as the other disks, being of deformable material, to some extent, disk 33 tends to flex in a flattening direction to thereby decrease the diameter of the bore through which stem 13 extends, thereby maintaining a close sealing engagement with the stem. In addition, this tendency to decrease the diameter of the bore of the disk also tends to increase the peripheral diameter of the disk, thereby tending to force it tightly against the wall of the recess to effect a good sealing engagement at this point. Because of the greater thickness of the disk at the peripheral edge, the pressure exerted against disk 33 tending to flatten it is transmitted to the other disks through the peripheral portion, hence, as shown, disks 31 and 32 have little or no flexing force applied and therefore little or no sealing effect but rather tend to be reserve sealing disks. However, when disk 33 wears sufficiently to permit it to flatten enough so that the bore portion of this disk contacts the adjacent bore or apex portion of disk 32, then the force due to spring 40 will be exerted against disk 32 in a manner to tend to flatten it, thereby generating the sealing pressure previously described. Likewise, when disk 32 wears sufficiently to permit it to flatten enough to engage disks 31, then disks 31 is made effective as a sealing member.

The angular relations between the sides of the disk 31, typical of the other disks, are shown in Figure 2, and while these angular relations have been found very satisfactory when used with the aforementioned "Teflon" material, they should not be considered as limiting in any sense for it is obvious that the angles used are dependent to some extent on the ratio of peripheral diameter to the bore diameter, the deformability of the materials used, and the spring pressure, as well as pressure due to the fluid being sealed against. Obviously, the flatter the disk tends to be, the greater the pressure that may be imposed on the sealing edge by a particular spring or other biasing means and, conversely the steeper the slope of the disk, the less sealing pressure will be exerted by the disk. The angles shown, as mentioned, have been found to be a good compromise for control valves normally used with heating systems, air conditioning apparatus and the like. While the tapered cross-section for disk 31 and the like is preferred, the disks may be made uniform in cross-sectional thickness, such as 41, 42 and 43, with annular spacer washers 44 and 45 being disposed between the peripheral portions of adjacent disks, as shown in Figure 3. Also as shown in Figure 4, the spacer portions 55, 56 and 57 may be made integral with the disks 51, 52 and 53, respectively, the spacer portions preferably being rounded.

Referring again to Figure 1, it will be obvious that the spacing between bearing surface 21 and sealing disk 33 on one end and the distance between sealing disk 31 and the upper end of recess 30, or bearing surface 22, are each greater than the permissible movement of valve member 14 and stem 13. Obviously, member 14 can rise only a short distance above the position shown and can extend no lower than permitted by valve seat 19. Thus, because the distance between the guide surfaces of the stem and the sealing portion of the structure are greater than the permissible movement of the stem, no guided portion for the stem can rub against the portion of the stem or shaft coacting with the sealing means. It has been found that polished shaft or stem greatly prolongs the life of the sealing disks but slight scratches, such as may be caused by foreign material scratching the shaft at the guide surfaces or the like, tend to cause rapid wear. By the present arrangement, even if foreign materials should get into the guide surface structure, no scratches thus formed can reach the sealing portion of the valve.

Obviously, if guide means 21 is relied on for preserving the alignment of stem or shaft 13, and bore 22 is made sufficiently larger than stem 13 so that it will not contact it at any time, then the stuffing nut 12 may be considerably shortened. However, as mentioned, the arrangement shown is preferred because it does a better job of guiding the stem and because the tighter fitting bore 22 tends to keep dirt and the like from entering the sealing recess.

While the valve shown is intended to be used as an automatic control valve, with a motor not shown, being applied above stem 13 for operation thereof, the present sealing arrangement can equally well be used with manually operated valves and may also be found useful on rotating shafts as well as reciprocable ones. However, in any installation, it is preferable that the apex portions of the disks be directed toward the side of greater pressure, with the spring working against the apex portion of the disks and be reinforced by any pressure available from the fluid or the like being handled. Obviously, if a valve such as this is being used for a steam heating system in which pressure is available at times but wherein a vacuum is held at other times, the disks will be faced properly for only one set of conditions. However, because the pressures or vacuums used in these cases are relatively low, the arrangement shown is preferred for, even though the spring must be strong enough to act against the effects of the vacuum in the passage or space 18, the pressure exerted is still relatively low.

As a study of the preceding specification and drawings will reveal many obvious substitutions and equivalents, the scope of this invention should be determined only by the appended claims.

I claim:

1. In a device having a chamber and a movable shaft extending into said chamber, sealing means for said shaft comprising a recess having a wall parallel to and concentric with said shaft and having an abutment portion spaced from said chamber, a plurality of cone shaped annular disks each having a bore fitting snugly against said shaft and its periphery engaging said wall, said plurality of disks forming a stack in abutting relation along their periphery, means along the periphery of each of said disks whereby the disks are spaced apart along the shaft for a major portion of their radial lengths, a base portion of one of said cone shaped disks engaging said abutment portion, and spring urged means tending to flatten at least one of said disks and thereby increase the pressure exerted by said disk on said shaft and against said wall.

2. In a device having a chamber and a movable shaft extending into said chamber, sealing means for said shaft comprising a recess having a wall parallel to and concentric with said shaft and having an abutment portion spaced from said chamber, a plurality of flattenable cone shaped annular disks each having a bore fitting snugly against said shaft and its periphery engaging said wall, means providing abutting relationship between the peripheries of said plurality of disks, said abutting relationship extending radially inwardly only for a minor portion of the radial lengths of said disks whereby the disks are spaced apart along the shaft, a base portion of one of said cone shaped disks engaging said abutment portion, and spring urged means tending to force said plurality of disks toward said abutment portion, said spring urged means engaging the disk most remote from said abutment portion relatively near its bore thereby tending to flex said disk in a flattening direction and against said shaft.

3. In a device having a chamber and a movable shaft extending into said chamber, sealing means for said shaft comprising a recess having a wall parallel to and concentric with said shaft and having an abutment portion spaced from said chamber, a plurality of cone shaped annular disks flexible in a flattening direction each having a bore fitting snugly against said shaft and its periphery engaging said wall, each of said disks being of uniform thickness, spacer means having a radial thickness less than half of the radial thickness of said disks and positioned between the adjacent peripheral portions of said plurality of disks, the base portion of one of said cone shaped disks engaging said abutment portion, and spring urged means tending to force said plurality of disks toward said abutment portion, said spring urged means engaging the disk most remote from said abutment portion relatively near its bore to thereby tend to flex said disk in a flattening direction, the flattening force on the other disks being negligible until the flattening of the more remote disk through wear causes it to engage the adjoining disk adjacent said shaft.

4. In a device having a chamber and a movable shaft extending into said chamber, sealing means for said shaft comprising a recess having a wall parallel to and concentric with said shaft and having an abutment portion spaced from said chamber, a plurality of cone shaped annular disks each having a central bore fitting snugly against said shaft and its periphery engaging said wall, each of said disks being of uniform thickness except for a rib located at the periphery of each disk and extending axially into abutting relationship with the periphery of the adjacent disk, the radial length of said rib being only a minor portion of the radial length of the disk, the rib thereby functioning as a spacer means between adjacent disks, the base portion of one of said cone shaped disks engaging said abutment portion, and spring means tending to force said plurality of disks toward said abutment portion, said spring urged means engaging the disk most remote from said abutment portion relatively near its bore to thereby tend to flex said disk in a flattening direction to thereby grip said shaft and to firmly engage said wall.

References Cited in the file of this patent

UNITED STATES PATENTS

| Number | Name | Date |
|---|---|---|
| 653,983 | Black | Aug. 17, 1900 |
| 828,554 | Kilborn | Aug. 14, 1906 |
| 1,032,187 | Clifford | July 9, 1912 |
| 1,085,377 | Caesar | Jan. 27, 1914 |
| 1,162,062 | Hogan | Nov. 30, 1915 |
| 1,200,966 | Minning | Oct. 10, 1916 |
| 1,875,936 | Saunders | Sept. 6, 1932 |
| 2,021,414 | Gits | Nov. 19, 1935 |
| 2,093,572 | Padgett | Sept. 21, 1937 |
| 2,224,231 | Mohr | Dec. 10, 1940 |
| 2,233,673 | Mayer | Mar. 4, 1941 |
| 2,236,625 | Marsh et al. | Apr. 1, 1941 |
| 2,278,347 | Cope | Mar. 31, 1942 |
| 2,282,312 | Halstead | May 12, 1942 |
| 2,342,276 | Hehemann | Feb. 22, 1944 |
| 2,467,312 | Jack | Apr. 12, 1949 |

FOREIGN PATENTS

| Number | Country | Date |
|---|---|---|
| 41,222 | France | Dec. 2, 1932 |
| 320,744 | Great Britain | Oct. 24, 1929 |
| 374,553 | Italy | Aug. 31, 1939 |
| 577,773 | France | June 12, 1924 |
| 646,677 | Great Britain | Jan. 10, 1951 |

OTHER REFERENCES

"New High Temperature Thermoplastic," published in Modern Plastics, October 1948, pp. 168–172. (Copy Scientific Library and Div. 52, Patent Office.)